(12) United States Patent
Chen (10) Patent No.: US 12,328,834 B1
(45) Date of Patent: Jun. 10, 2025

(54) ELECTRONIC DEVICES WITH ANTI-DISASSEMBLY MECHANISMS AND THE OPERATION METHOD THEREOF

(71) Applicant: Nanning FuLian FuGui Precision Industrial Co., Ltd., Nanning (CN)

(72) Inventor: Zhi-Ming Chen, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

(21) Appl. No.: 18/754,207

(22) Filed: Jun. 26, 2024

(30) Foreign Application Priority Data

Jun. 19, 2024 (CN) .......................... 202410788993.7

(51) Int. Cl.
*H05K 5/02* (2006.01)
*F16B 41/00* (2006.01)
(Continued)

(52) U.S. Cl.
CPC ............. *H05K 5/13* (2025.01); *F16B 41/005* (2013.01); *H05K 5/0208* (2013.01);
(Continued)

(58) Field of Classification Search
CPC ...... H05K 5/0208; H05K 5/0221; H05K 5/03; H05K 5/10; H05K 5/13; H05K 5/0217; F16B 41/005; F16B 5/02; F16B 39/103; B65D 55/022; E05B 15/0046; E05B 73/00; E05B 73/0017; E05B 73/0023; E05B 73/0047; E05B 73/0058; E05B 73/0064; E05B 73/0082; E05B 2073/0088
(Continued)

(56) References Cited

U.S. PATENT DOCUMENTS 5,530,999 A * 7/1996 Barnes .................. F16B 21/165
24/635
7,748,091 B2 * 7/2010 Bogh-Sorensen .... F16B 21/165
403/322.2
(Continued)

FOREIGN PATENT DOCUMENTS

CN 110319081 A * 10/2019 ................ F16B 5/02
CN 110418527 A * 11/2019 ................ F16B 5/02
(Continued)

*Primary Examiner* — Adrian S Wilson
*Assistant Examiner* — Gage Crum
(74) *Attorney, Agent, or Firm* — ScienBiziP, P.C.

(57) ABSTRACT

An electronic device with an anti-disassembly mechanism and the operation method thereof are provided. The electronic device includes a first housing, and a second housing contacting the first housing. A hollow base is affixed to the first housing. A fastening element is movably disposed in the hollow base. An ejection element is movably disposed in the fastening element. An unlocking bolt is movably disposed in the ejection element and the fastening element. A fastening screw extends through the hollow base, and includes a one-way inner ratchet and a one-way outer ratchet. When the fastening screw is fastened to the second housing, the fastening element rotates the one-way outer ratchet in a fastening rotation direction. When the fastening screw is detached from the second housing, the unlocking bolt is rotates in the one-way inner ratchet in an unlocking rotation direction.

14 Claims, 9 Drawing Sheets

(51) Int. Cl.
*H05K 5/13* (2025.01)
*G06F 21/78* (2013.01)
*G06F 21/86* (2013.01)

(52) U.S. Cl.
CPC .......... *H05K 5/0221* (2013.01); *G06F 21/78* (2013.01); *G06F 21/86* (2013.01)

(58) Field of Classification Search
USPC .................................................. 411/910, 911
See application file for complete search history.

(56) References Cited

U.S. PATENT DOCUMENTS

| | | | | |
|---|---|---|---|---|
| 8,011,867 | B2 * | 9/2011 | Shepherd | F16B 5/0208 411/383 |
| 10,285,288 | B1 * | 5/2019 | Su | H05K 5/03 |
| 10,939,568 | B2 * | 3/2021 | Jiang | H05K 5/10 |
| 2004/0182206 | A1 * | 9/2004 | Korpi | F16B 41/005 81/121.1 |
| 2005/0147486 | A1 * | 7/2005 | Barbanti | F16B 41/005 411/432 |
| 2010/0322741 | A1 * | 12/2010 | Lanneree | F16B 41/005 411/500 |
| 2013/0209194 | A1 * | 8/2013 | Kratzer | F16B 41/00 411/204 |
| 2014/0147226 | A1 * | 5/2014 | Andrade de Souza | F16B 41/005 411/3 |
| 2016/0066444 | A1 * | 3/2016 | Fan | H05K 5/0208 439/78 |
| 2018/0313395 | A1 * | 11/2018 | Rajewski | F16B 41/005 |
| 2020/0375052 | A1 * | 11/2020 | Kim | G06F 1/1616 |
| 2023/0128386 | A1 * | 4/2023 | Wu | F16B 2/04 414/754 |
| 2024/0011518 | A1 * | 1/2024 | Peng | F16B 21/02 |

FOREIGN PATENT DOCUMENTS

| | | | | |
|---|---|---|---|---|
| CN | 110418526 | B * | 3/2021 | ............ G06F 21/78 |
| CN | 215848005 | U * | 2/2022 | |
| TW | I692686 | B | 5/2020 | |
| TW | M621621 | U | 12/2021 | |

* cited by examiner

ELECTRONIC DEVICES WITH ANTI-DISASSEMBLY MECHANISMS AND THE OPERATION METHOD THEREOF

FIELD

The subject matter herein generally relates to electronic devices with anti-disassembly mechanisms and the operation method thereof.

BACKGROUND

The assembly of electronic devices generally involves installing multiple electronic components into a housing, and then locking the housing with screws. However, children can easily use a screwdriver to remove the screws to open the housing, and then disassemble the electronic components in the housing, causing damage to the electronic device.

In addition, if only screws are used to lock the housing, it is possible for others to easily steal electronic components such as storage devices inside the housing, causing huge losses.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connect" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

In the present disclosure, an anti-disassembly mechanism is used to fasten the housing of an electronic apparatus by common tools such as screwdrivers by allows. However, when opening the housing, a specific unlocking tool is needed, and there are multiple steps to open the housing, which increase the difficulty of opening the housing.

Figure 1:
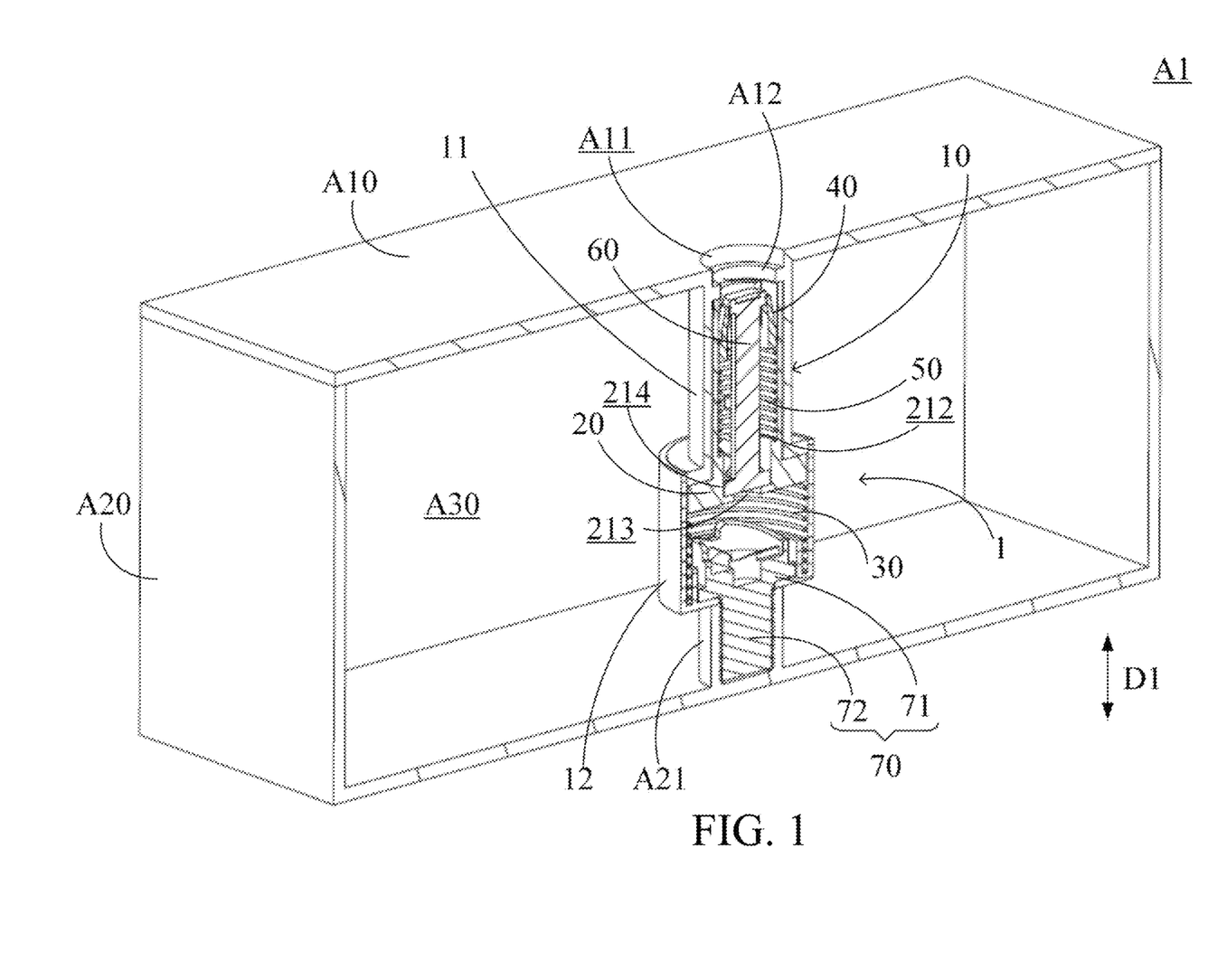
FIG. 1 is a schematic diagram of an electronic device with an anti-disassembly mechanism in accordance with an embodiment of the present disclosure.
Figure 2A:
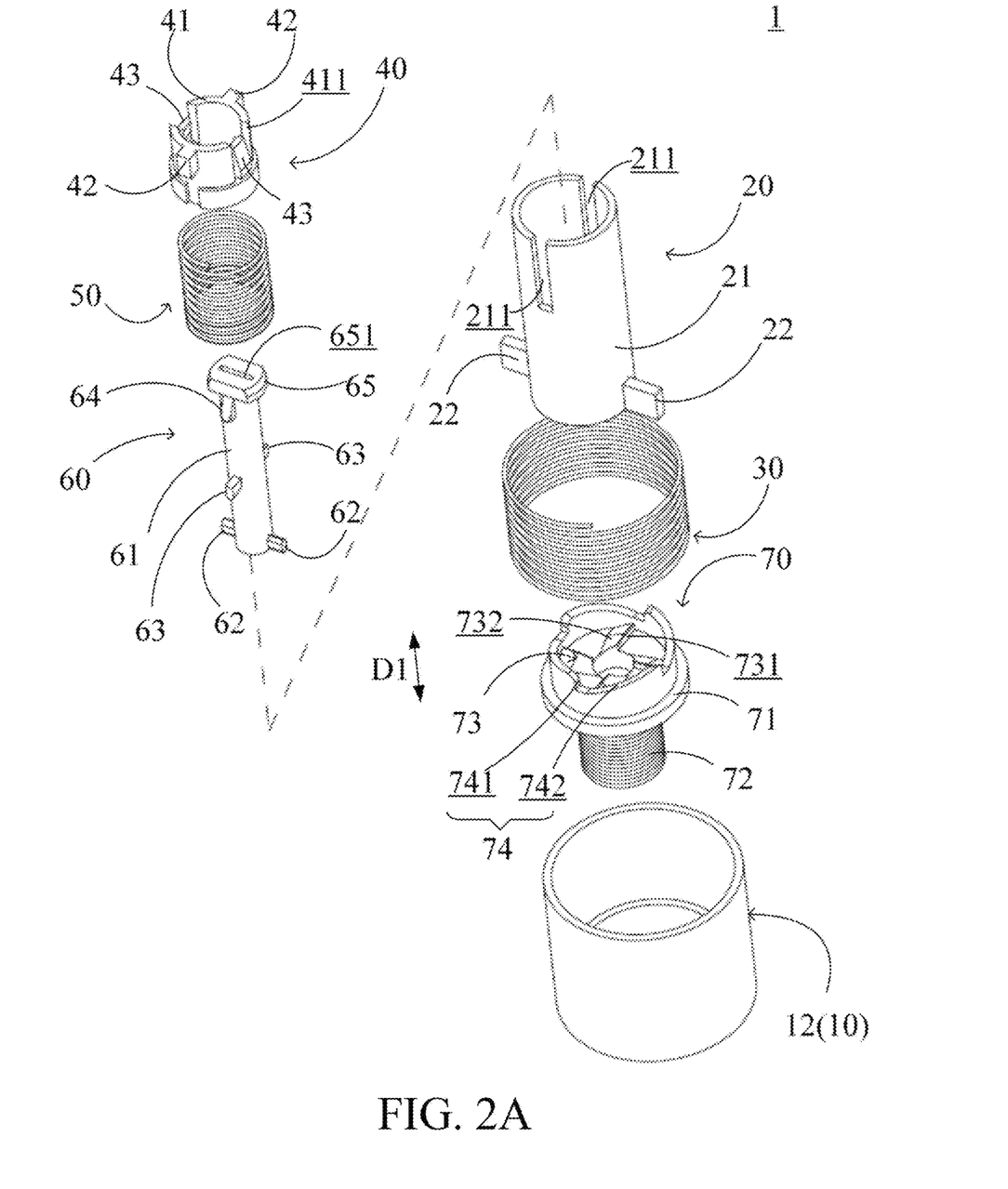
FIG. 2A and FIG. 2B are perspective views of the anti-disassembly mechanism in FIG. 1.
Figure 2B:
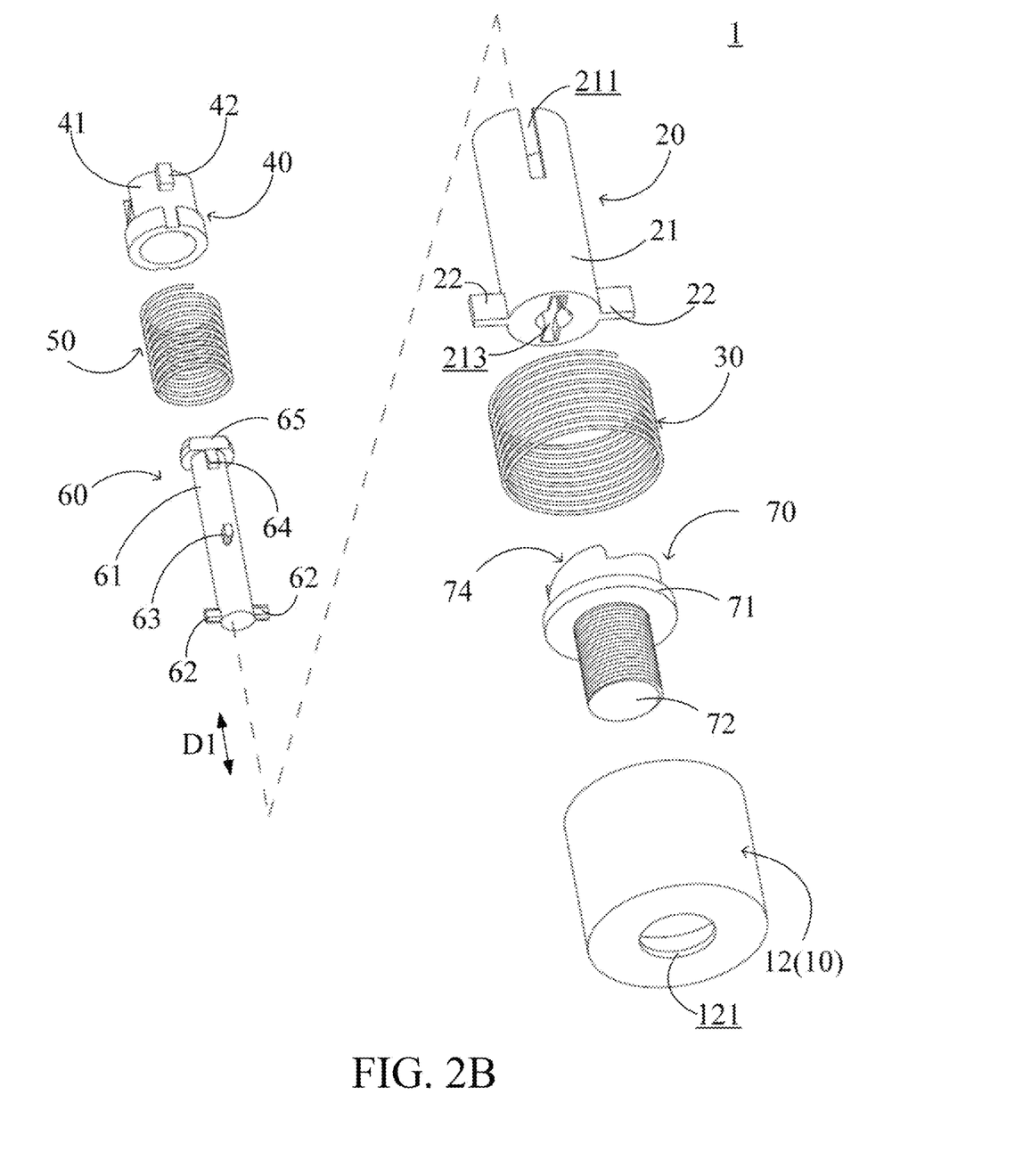

FIG. 1 is a schematic diagram of an electronic device A1 with an anti-disassembly mechanism 1 in accordance with an embodiment of the present disclosure. FIG. 2A and FIG. 2B are perspective views of the anti-disassembly mechanism 1 in FIG. 1. The electronic device A1 includes a first housing A10, a second housing A20, and an anti-disassembly mechanism 1. The first housing A10 includes an opening A11. The second housing A20 contacts the first housing A10, and includes a locking base A21. The locking base A21 is a hollow structure. The first housing A10 may be a cover, or the second housing A20 may be a cover. In the embodiment, the second housing A20 is fastened to the first housing A10. The chamber A30 is formed between the first housing A10 and the second housing A20. Some electronic components, such as circuit boards, processors, storage devices, memories, communication devices and/or electrical connectors, etc., can be mounted in chamber A30.

Figure 4:
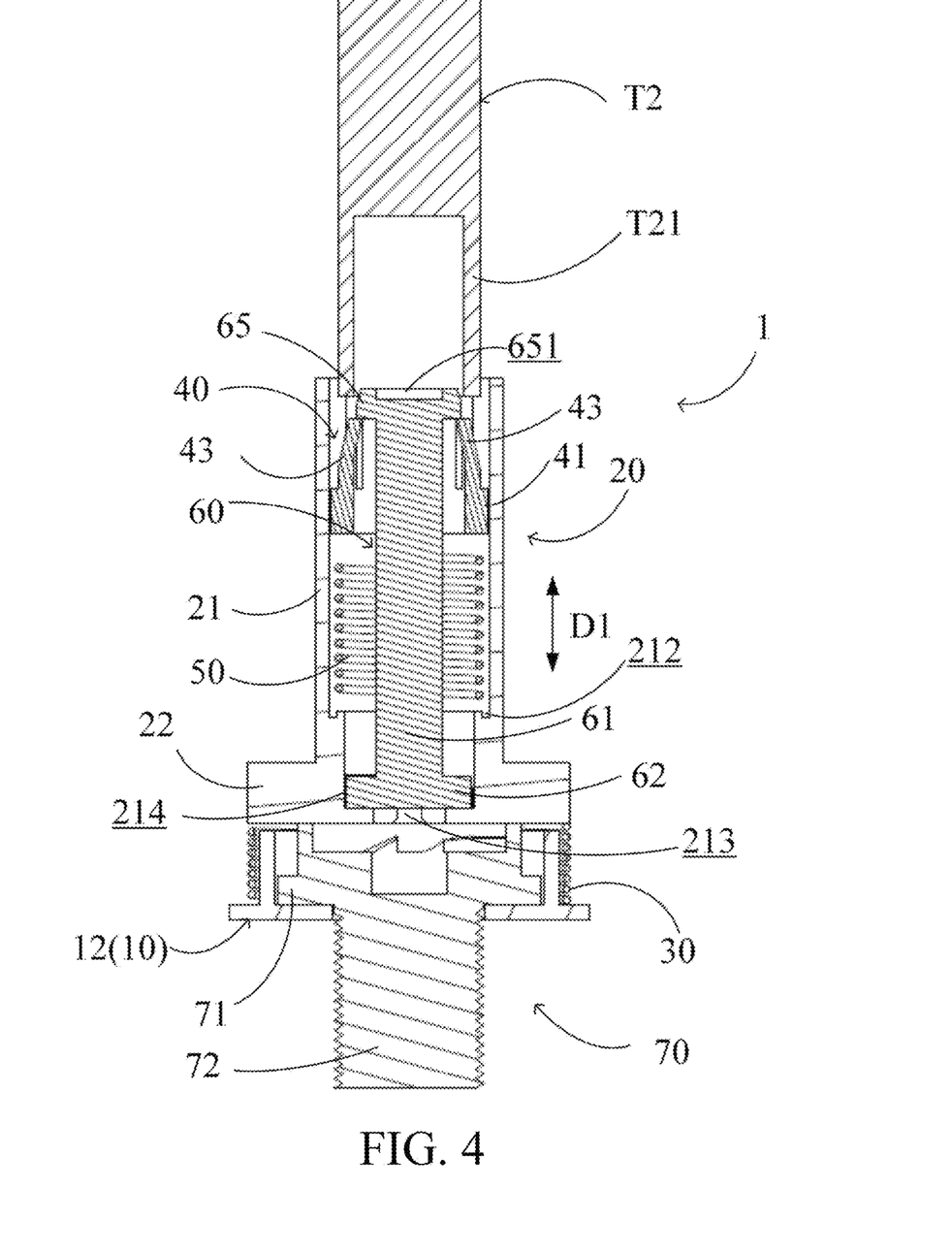
FIG. 4, FIG. 5 and FIG. 6 are cross-sectional views of the anti-disassembly mechanism in an unlocking operation of the operation method.

The anti-disassembly mechanism 1 is disposed in the chamber A30. The anti-disassembly mechanism 1 contacts the first housing A10 and the second housing A20, and is positioned correspondingly to the opening A11 and the locking base A21. The anti-disassembly mechanism 1 is used to fastened the first housing A10 to the second housing A20. The user needs to use a specific unlocking tool T2 (as shown in FIG. 4) and multiple operating steps to open the first housing A10 relative to the second housing A20, or to separate the first housing A10 from the second housing A20.

The anti-disassembly mechanism 1 includes a hollow base 10, a fastening element 20, a first elastic element 30, an ejection element 40, an unlocking bolt 60, and a fastening screw 70. The hollow base 10 is affixed to the first housing A10, and contacts the locking base A21 of the second housing A20. In the embodiment, the hollow base 10 includes a first holder 11 and a second holder 12. The first holder 11 is affixed to the first housing A10, and the first holder 11 and the first housing A10 are integrally formed. The first holder 11 and the first housing A10 can be made of the same materials. The first holder 11 is a hollow structure, and positioned correspondingly to the opening A11.

The second holder 12 is affixed to the first holder 11, and contacts the locking base A21. The second holder 12 is a hollow structure, and includes aperture 121. In other words, when the first housing A10 is fastened to the second housing A20 by the anti-disassembly mechanism 1, the first holder 11 is communicating with the opening A11 and the second holder 12, and the second holder 12 is communicating with the first holder 11 and the locking base A21. The first holder 11 and the second holder 12 are elongated structures, and extend in the extension direction D1. The opening A11, the first holder 11, the second holder 12, the aperture 121, and the locking base A21 are arranged in an extension direction D1. The second holder 12 is between the first holder 11 and the locking base A21. In the embodiment, the width of the second holder 12 is greater than the width of the first holder 11. The width of the second holder 12 and the width of the first holder 11 are measured in the same direction, which is perpendicular to the extension direction D1.

The fastening element 20 is movably disposed in the first holder 11 and the second holder 12 of the hollow base 10. The fastening element 20 includes the fastening body 21 and two locking ribs 22. The fastening body 21 is a hollow structure and an elongated structure, extending in the extension direction D1. The fastening body 21 is movably disposed between the first holder 11 and the second holder 12. The locking ribs 22 are disposed on the outer surface of the fastening body 21, and is movably disposed in the second holder 12. In the embodiment, the locking ribs 22 extend perpendicular to the extension direction D1, and are connected to the lower portion of the fastening body 21. Moreover, the fastening body 21 is between the locking ribs 22. In the embodiment, the first housing A10 further includes the blocking structure A12 disposed in the opening A11. The blocking structure A12 is used to block the fastening body 21, to prevent the fastening body 21 from breaking away from the first housing A10 via the opening A11.

The first elastic element 30 is disposed in the second holder 12 of the hollow base 10, and abuts the locking ribs 22 of the fastening element 20 and the lower portion of the second holder 12. In the embodiment, the first elastic element 30 may be a spring. The first elastic element 30 is used to provide an elastic force to maintain the fastening element 20 in the initial position as shown in FIG. 1. In the initial position, the locking ribs 22 are in the upper portion of the second holder 12. The upper portion of the fastening body 21 is adjacent to the opening A11 of the first housing A10, and contacts the blocking structure A12. In the embodiment, the width of first elastic element 30 is greater the width of the aperture 121 and the width of the first holder 11. The width of the first elastic element 30, the width of the aperture 121, the width of the first holder 11 are measured in the same direction, which is perpendicular to the extension direction D1.

The ejection element 40 is movably disposed in the fastening body 21 of the fastening element 20. The ejection element 40 includes an ejection body 41, two guide ribs 42, and two elastic arms 43. The ejection body 41 is a hollow structure, and is an elongated structure, extending in the extension direction D1. Two guide ribs 42 are disposed on the outer surface of the ejection body 41, and connected to the upper portion of the ejection body 41. Moreover, the ejection body 41 are between the guide ribs 42. In the embodiment, the fastening body 21 of the fastening element 20 further includes guiding grooves 211, extending in the extension direction D1. The guide ribs 42 are in the guiding grooves 211, to guide the ejection element 40 moving in the extension direction D1. The blocking structure A12 of the first housing A10 can block the ejection element 40, to prevent the ejection element 40 from breaking away from the first housing A10 via the opening A11.

The ejection body 41 includes two slots 411. The elastic arms 43 are connected to the ejection body 41, and in the slots 411. The slots 411 extend in the extension direction D1. In the embodiment, the bottom ends of the elastic arms 43 are connected to the ejection body 41, and the top ends of the elastic arms 43 extend toward the center of the ejection body 41. In other words, the elastic arms 43 obliquely extend toward the center of the ejection body 41 from the bottom ends of the elastic arms 43 to the top ends of the elastic arms 43. The top ends of the elastic arms 43 are separated from each other.

The second elastic element 50 is disposed in the fastening body 21 of the fastening element 20. The second elastic element 50 abuts the spring groove 212 formed on the inner wall of the fastening body 21, and the lower portion of the ejection element 40 (as shown in FIG. 1). In the embodiment, the second elastic element 50 may be a spring. The second elastic element 50 is used to provide an elastic force to maintain the ejection element 40 in the initial position as shown in FIG. 1. In the initial position, the ejection element 40 is adjacent to the opening A11 of the first housing A10, and contacts the blocking structure A12. In the embodiment, the width of the first elastic element 30 is greater than the width of the second elastic element 50. The width of the first elastic element 30 and the width of the second elastic element 50 are measured in the same direction, which is perpendicular to the extension direction D1.

The unlocking bolt 60 is movably disposed in the ejection body 41 of the ejection element 40 and the fastening body 21 of the fastening element 20. The unlocking bolt 60 includes an unlocking rod 61, two unlocking ribs 62, two restriction ribs 63, two buckles 64, and an unlocking head 65. The unlocking rod 61 extends in the extension direction D1, and movably disposed in the ejection body 41, the fastening body 21, and the second elastic element 50. The unlocking ribs 62 are connected to the lower portion of the unlocking rod 61, and extend perpendicular to the extension direction D1. Moreover, the unlocking rod 61 is between the unlocking ribs 62. The restriction ribs 63 are connected to the central portion of the unlocking rod 61, and extend perpendicular to the extension direction D1. Moreover, the unlocking rod 61 is between the restriction ribs 63.

In the embodiment, the lower portion of the fastening body 21 of the fastening element 20 further includes two buckle grooves 214 and an unlocking hole 213 as shown in FIG. 1. The buckle grooves 214 and the unlocking hole 213 surround the center of the fastening body 21 and are arranged alternately. The unlocking ribs 62 can be selectively located in the buckle grooves 214 or in the unlocking hole 213 by rotating the fastening element 20. Moreover, the center of each unlocking rib 62 is separated from the center of each restriction rib 63 on a projection surface, which is perpendicular to the extension direction D1.

The buckles 64 are connected to the upper portion of the unlocking rod 61, and extend perpendicular to the extension direction D1. Moreover, the unlocking rod 61 is between the buckles 64. When the buckles 64 are on the elastic arms 43 in the extension direction D1, the top ends of the elastic arms 43 abut the buckles 64. In other words, the distance between the free ends of the buckles 64 is greater than the distance between the top ends of the elastic arms 43. The distance of the free ends of the buckles 64 and the top ends of the elastic arms 43 are measured in the same direction, which is perpendicular to the extension direction D1.

The unlocking head 65 is connected to the top end of the unlocking rod 61. The width of the unlocking head 65 is greater than the width of the unlocking rod 61. The width of the unlocking head 65 and the width of the unlocking rod 61 are measured in the same direction, which is perpendicular to the extension direction D1. In the embodiment, the unlocking head 65 is an elongated structure. In two directions, which are perpendicular to each other and are perpendicular to the extension direction D1, the unlocking head 65 respectively includes a longer width and a shorter width. The longer width is greater than the shorter width. Moreover, the longer width is greater than the distance between the top ends of the elastic arms 43, and the shorter width is less than the distance between the top ends of the elastic arms 43. In the embodiment, the unlocking head 65 includes a rotation groove 651. The rotating tool T1 can rotate the unlocking bolt 60 by inserting the rotation groove 651. In addition, the rotating tool T1 can be a screwdriver.

The fastening screw 70 extends through the hollow base 10. The fastening screw 70 includes a screw head 71 and a screw rod 72 connected to the screw head 71. The screw rod 72 of the fastening screw 70 extends through the aperture 121 of the hollow base 10, and is fastened to the locking base A21 of the second housing A20, thereby affixing the first housing A10 to the second housing A20. The width of the screw head 71 is greater than the width of the screw rod 72 and the width of the aperture 121. The width of the screw head 71, the width of the screw rod 72, and the width of the aperture 121 are measured in the same direction, which is perpendicular to the extension direction D1. The screw head 71 includes one-way inner ratchets 73 and one-way outer ratchets 74. The one-way inner ratchets 73 surround the center of the screw head 71. The one-way outer ratchets 74 surround the one-way inner ratchets 73.

Figure 3:
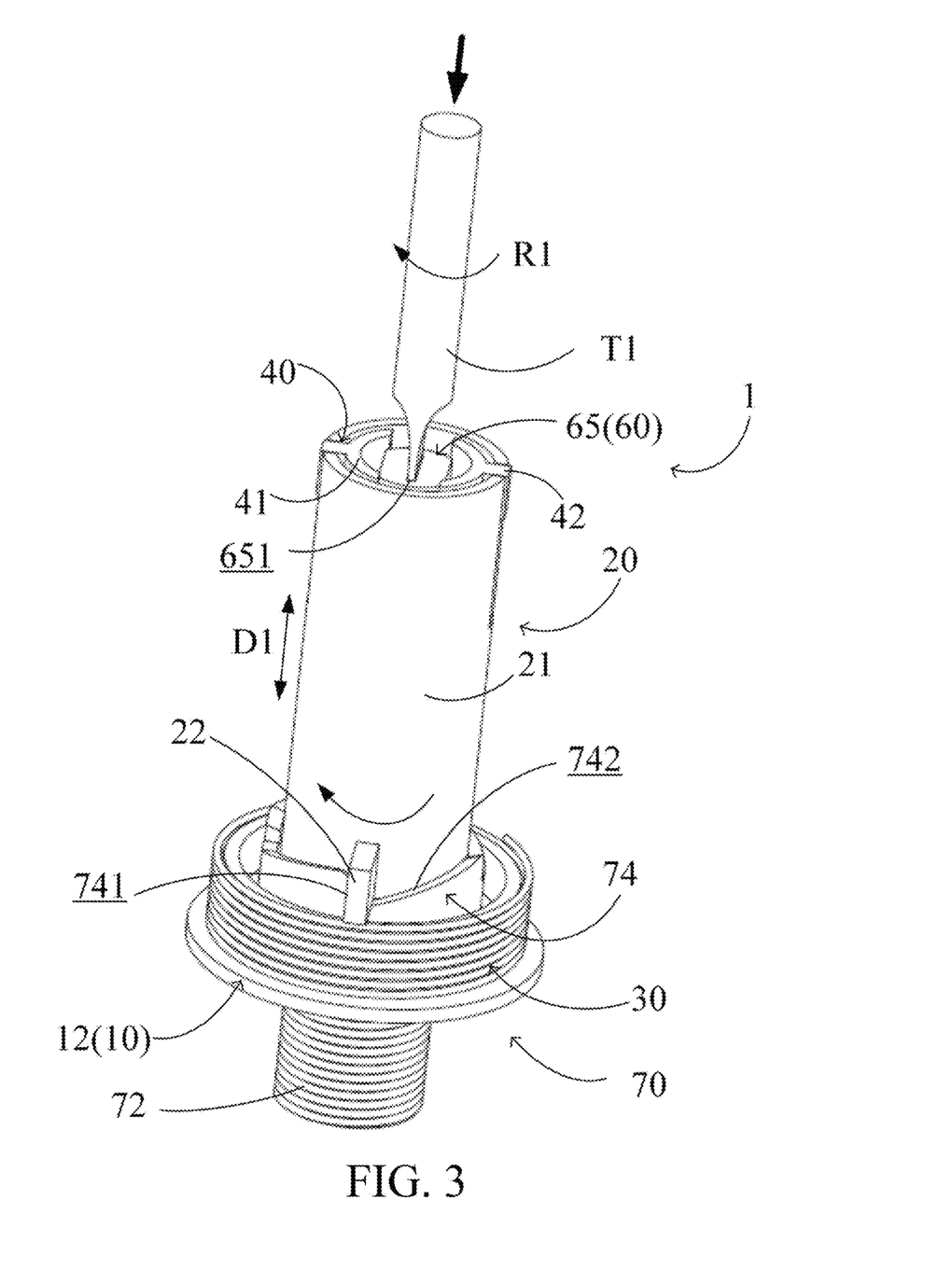
FIG. 3 is a perspective view of the anti-disassembly mechanism in a locking operation of an operation method.

FIG. 3 is a perspective view of the anti-disassembly mechanism 1 in a locking operation of an operation method. For the purpose of clarity, some components are omitted in FIG. 3. When the fastening screw 70 is fastened to the second housing A20 in FIG. 1, the rotating tool T1 is inserted into the rotation groove 651 of the unlocking head 65, and the rotating tool T1 presses the unlocking bolt 60, so that the unlocking bolt 60 is moved from an initial position toward the fastening screw 70. At this time, the unlocking rib 62 of the unlocking bolt 60 is engaged in the buckle groove 214 of the fastening element 20, thereby prohibiting the unlocking bolt 60 from rotating relative to the fastening element 20. Therefore, the unlocking bolt 60 can drive the fastening element 20 to move from the initial position toward the fastening screw 70, until the locking rib 22 of the fastening element 20 contacting the one-way outer ratchet 74.

Finally, the rotating tool T1 is used to rotate the unlocking bolt 60 in the fastening rotation direction R1. The unlocking bolt 60 drives the fastening element 20 to rotate in the fastening rotation direction R1 by the unlocking rib 62. The locking rib 22 of the fastening element 20 rotates the one-way outer ratchet 74 of the fastening screw 70 in the fastening rotation direction R1, so that the fastening screw 70 can be fastened to the locking base A21 of the second housing A20. In addition, when the rotating tool T1 is removed from the unlocking bolt 60, the first elastic element 30 and the second elastic element 50 return the fastening element 20 and the ejection element 40 to the initial position. Therefore, the user can simply use tools such as screwdrivers to combine the first housing A10 and the second housing A20 through the anti-disassembly mechanism 1.

In the embodiment, each the one-way outer ratchet 74 includes an outer blocking wall 741 and an outer slope 742. When the locking rib 22 rotates in the fastening rotation direction R1, the locking rib 22 pushes the outer blocking wall 741 to make the fastening screw 70 to rotate in the fastening rotation direction R1. When the locking rib 22 rotates in the unlocking rotation direction R2, the locking rib 22 slides along the outer slope 742, so the locking rib 22 cannot rotate the fastening screw 70. If the rotating tool T1 is used to press the unlocking bolt 60 and rotate the unlocking bolt 60 in the unlocking rotation direction R2 according to the locking operation, the locking rib 22 of the fastening element 20 cannot rotate the one-way outer ratchet 74 of the fastening screw 70 in an unlocking rotation direction R2. Therefore, the user cannot easily unlock the anti-disassembly mechanism 1 using the rotating tool T1. In the embodiment, the unlocking rotation direction R2 is opposite to the fastening rotation direction R1.

Figure 5:
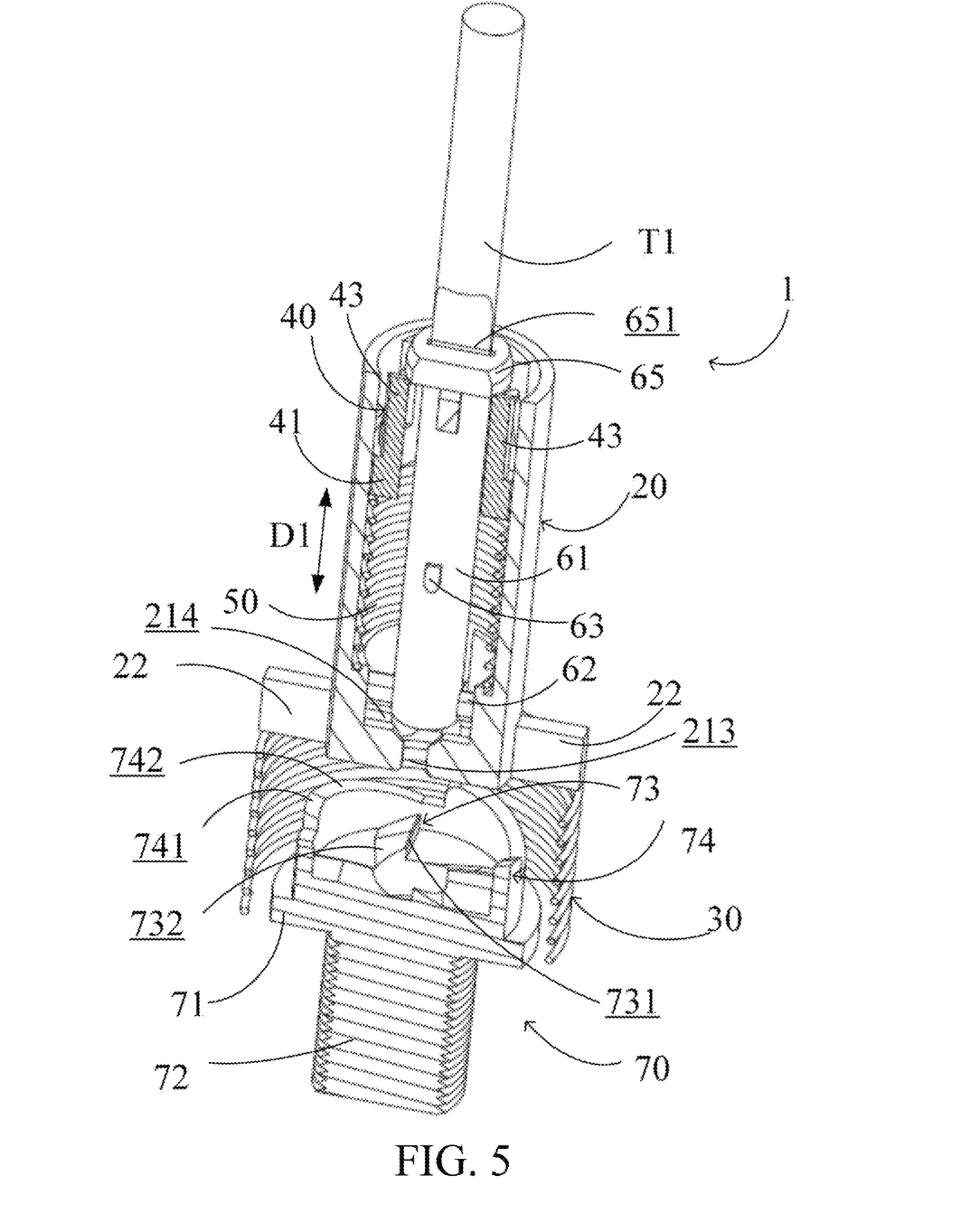
Figure 6:
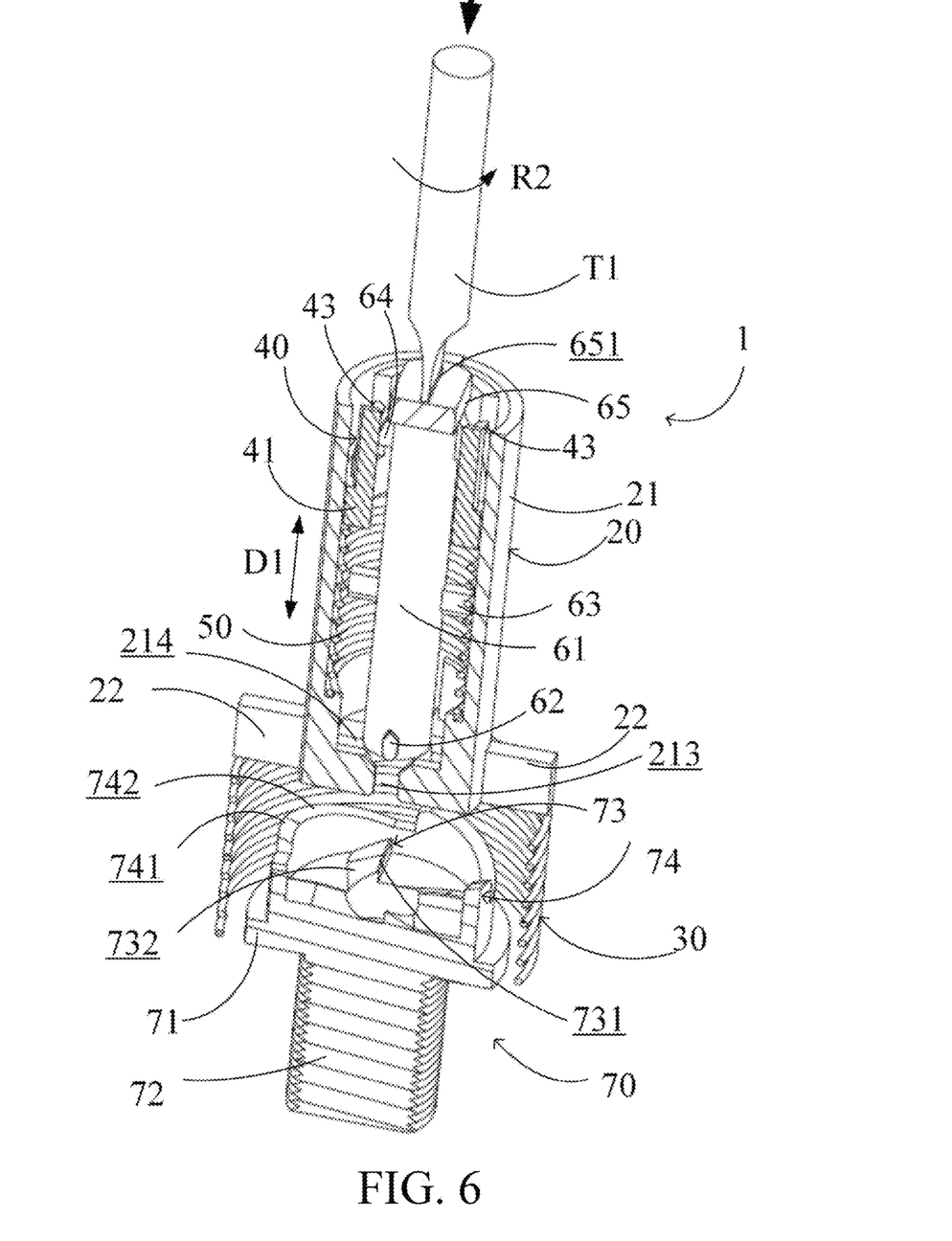
Figure 7:
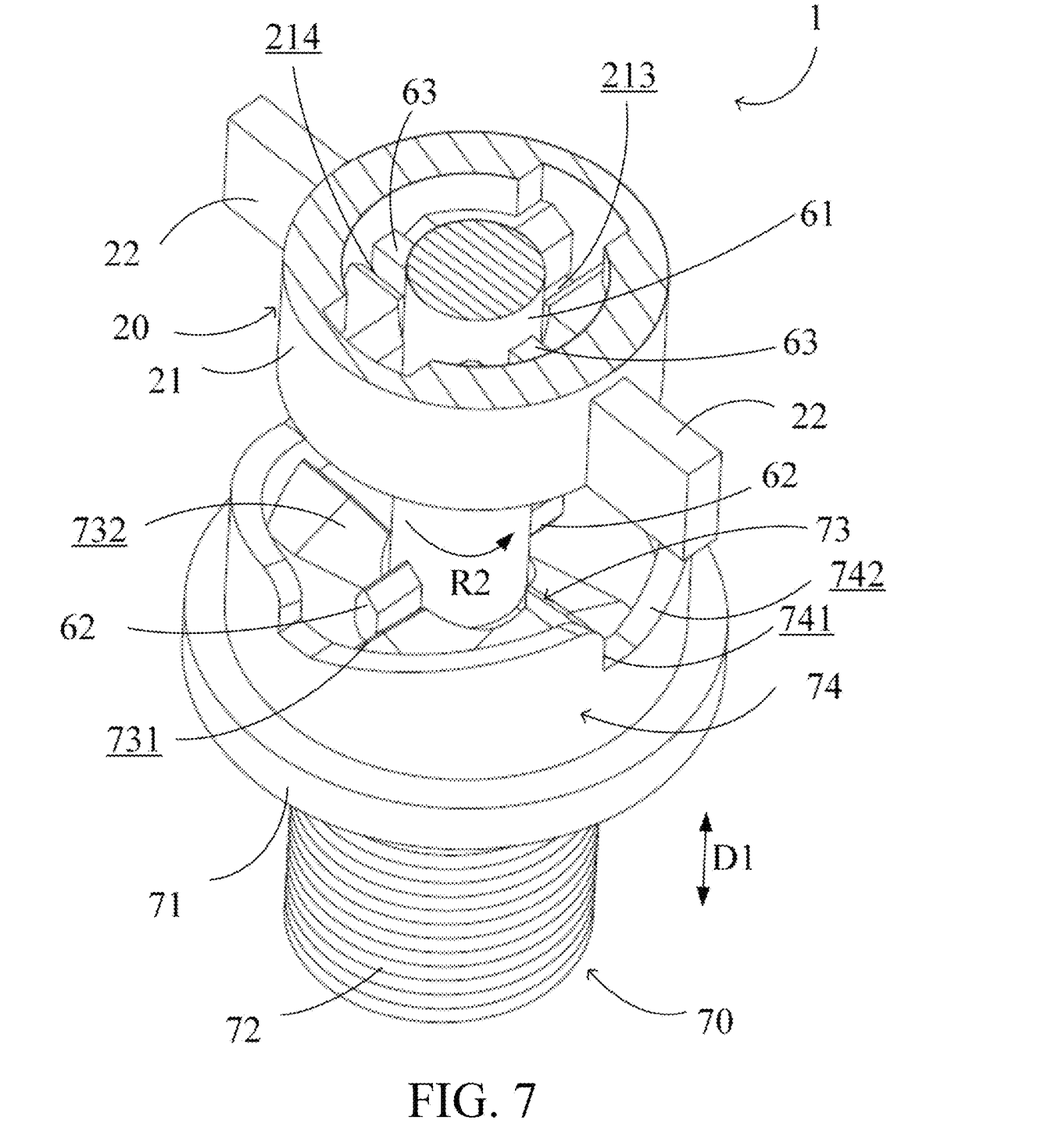
FIG. 7 is a perspective view of the anti-disassembly mechanism in the unlocking operation.

FIG. 4 to FIG. 6 are cross-sectional views of the anti-disassembly mechanism 1 in an unlocking operation of the operation method. FIG. 7 is a perspective view of the anti-disassembly mechanism 1 in the unlocking operation. For the purpose of clarity, some components are omitted in FIG. 4 to FIG. 7. When disengaging the fastening screw 70 from the second housing A20 in FIG. 1, the unlocking tool T2 is used to press the ejection element 40 and move it toward the fastening screw 70 in the extension direction D1, so that the unlocking head 65 of the unlocking bolt 60 is located at the elastic arm 43 of the ejection element 40 (as shown in FIG. 4).

In the embodiment, the unlocking tool T2 includes a sleeve T21, and the sleeve T21 is a hollow structure. The width of the sleeve T21 is less than the width of the fastening body 21, and the width of the sleeve T21 is greater than the width of the unlocking head 65. After the unlocking tool T2 presses the ejection element 40, the unlocking head 65 is located in the sleeve T21, and the end of the sleeve T21 is located in the fastening body 21. Moreover, the unlocking tool T2 can be combined with the rotating tool T1, or the unlocking tool T2 and the rotating tool T1 are combined into a single tool.

As shown FIG. 5, when unlocking tool T2 is removed, the ejection element 40 is released. The first elastic element 30 and second elastic element 50 return the fastening element 20 and the ejection element 40 to the initial position. At this time, the unlocking head 65 is lifted to an ejection position by the elastic arm 43 of the ejection element 40. When the unlocking bolt 60 is in the ejection position, the restriction rib 63 of the unlocking bolt 60 breaks away from the buckle groove 214 of the fastening element 20.

As shown in FIG. 6, the rotating tool T1 is used to rotate the unlocking head 65, so that the unlocking head 65 is separated from the elastic arm 43 (or the top end of the elastic arm 43 in the extension direction D1). In the embodiment, the rotating tool T1 rotates 90 degrees the unlocking head 65. At this time, the unlocking rib 62 is located above the unlocking hole 213 in the extension direction D1, and the restriction rib 63 is located above the buckle groove 214 in the extension direction D1.

As shown in FIG. 6 and FIG. 7, the rotating tool T1 is used to press the unlocking head 65 in the extension direction D1, so that the unlocking rib 62 of the unlocking bolt 60 passes through the unlocking hole 213 of the fastening element 20 and then contacts the ne-way inner ratchet 73 of the fastening screw 70. Finally, the rotating tool T1 is used to rotate the unlocking bolt 60 in the unlocking rotation direction R2, so that the unlocking rib 62 rotates the one-way inner ratchet 73 in the unlocking rotation direction R2, and then the fastening screw 70 is separated from the locking base A21 in FIG. 1. Therefore, the user needs to use a specific unlocking tool T2 and go through multiple unlocking steps to separate or open the first housing A10 and the second housing A20.

In the embodiment, each one-way inner ratchet 73 includes an inner blocking wall 731 and an inner slope 732. When the unlocking rib 62 is rotated in the unlocking rotation direction R2, the unlocking rib 62 pushes the inner blocking wall 731 to rotate the fastening screw 70 in the unlocking rotation direction R2. When the unlocking rib 62 rotates in the fastening rotation direction R1, the unlocking rib 62 slides along the inner slope 732, so the unlocking rib 62 cannot rotate the fastening screw 70 in the fastening rotation direction R1.

Figure 8:
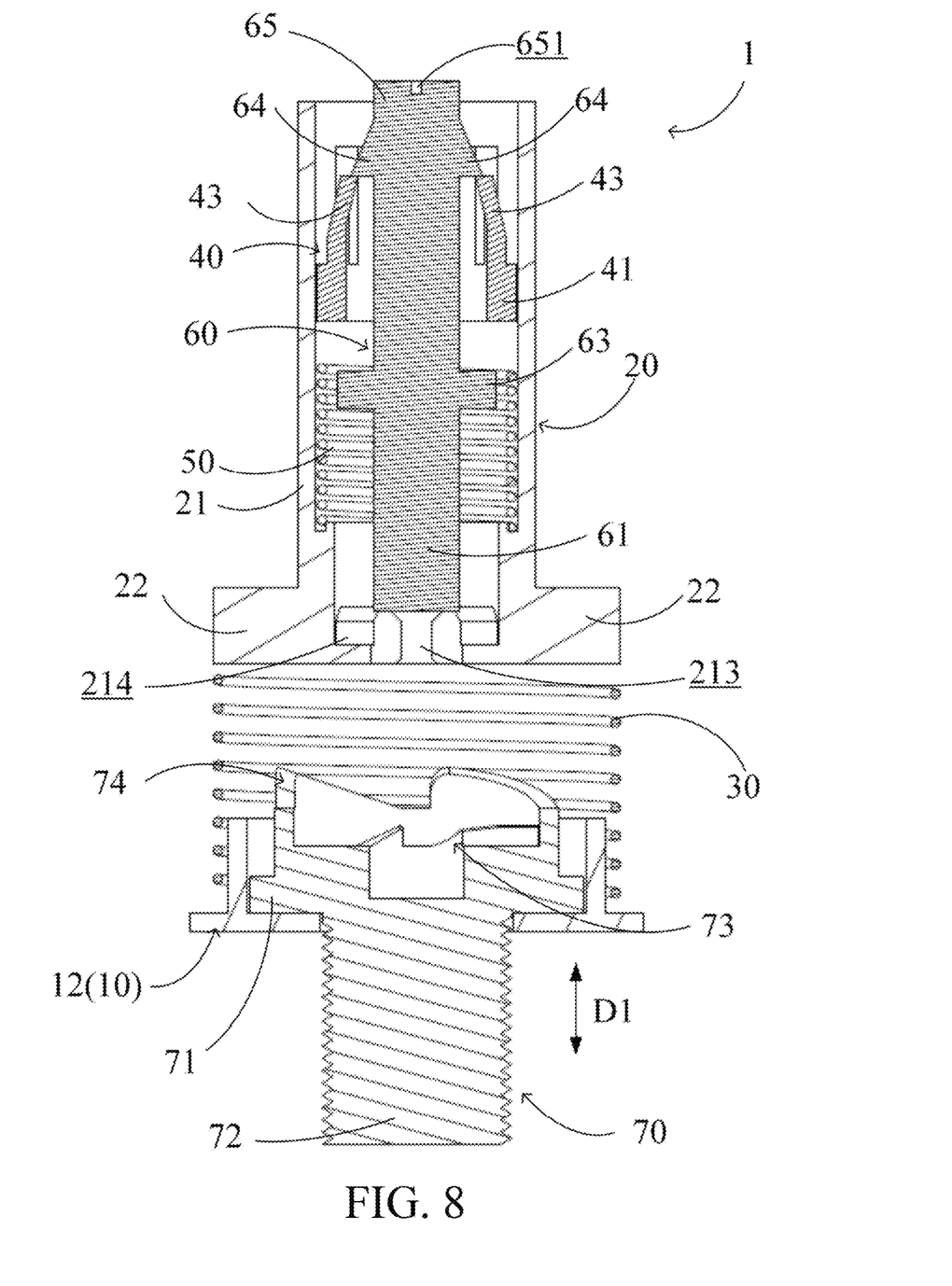
FIG. 8 is a cross-sectional view of the anti-disassembly mechanism in a recovery operation of the operation method.

FIG. 8 is a cross-sectional view of the anti-disassembly mechanism 1 in a recovery operation of the operation method. After the user unlocks the anti-disassembly mechanism 1 through the unlocking operation, the unlocking tool T2 in FIG. 4 can be used to press the ejection element 40, so that the elastic arm 43 of the ejection element 40 lifts the buckle 64 of the unlocking bolt 60 to the raised position. The unlocking rib 62 of the unlocking bolt 60 passes upward through the unlocking hole 213 in the extension direction D1 and is located within the fastening element 20.

After that, the rotating tool T1 in FIG. 3 is used to rotate the unlocking head 65 to make the buckle 64 of the unlocking bolt 60 break away from the elastic arm 43, so that the second elastic element 50 can further lift the ejection element 40 to the initial position, and make the unlocking head 65 located within the ejection element 40. Afterward, the user can lock the fastening screw 70 to the locking base A21 of the second housing A20 again according to the locking operation in FIG. 3.

In conclusion, users can use common tools such as screwdrivers to fasten the housing by the anti-disassembly mechanism. However, when opening a housing, a specific unlocking tool is needed, and there are multiple steps to open the housing, which increase the difficulty of opening the housing.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An electronic device, comprising:
   a first housing;
   a second housing contacting the first housing;
   a hollow base affixed to the first housing;
   a fastening element movably disposed in the hollow base;
   an ejection element movably disposed in the fastening element;
   an unlocking bolt movably disposed in the ejection element and the fastening element;
   a first elastic element disposed in the hollow base, and abutting the fastening element; and
   a second elastic element disposed in the fastening element, and abutting the ejection element; and
   a fastening screw extending through the hollow base, and comprising a one-way inner ratchet and a one-way outer ratchet,
   wherein when the fastening screw is fastened to the second housing, the unlocking bolt is pressed to make the fastening element contact the one-way outer ratchet, and then the unlocking bolt is rotated in a fastening rotation direction to make the fastening element rotate the one-way outer ratchet, and
   when the fastening screw is detached from the second housing, the unlocking bolt is rotated and pressed to make the unlocking bolt contact the one-way inner ratchet, and then the unlocking bolt is rotated in an unlocking rotation direction to make the unlocking bolt rotate the one-way inner ratchet.

2. The electronic device as claimed in claim 1, wherein the fastening element comprising:
   a fastening body, wherein the ejection element is movably disposed in the fastening body; and
   a locking rib disposed on an outer surface of the fastening body,
   wherein when the fastening screw is fastened to the second housing, the unlocking bolt is pressed to make the locking rib of the fastening element contact the one-way outer ratchet, and then the unlocking bolt is rotated in a fastening rotation direction to make the locking rib rotate the one-way outer ratchet.

3. The electronic device as claimed in claim 1, wherein the unlocking bolt further comprises:
   an unlocking rod movably located in the ejection element and the fastening element; and
   an unlocking rib connected to a lower portion of the unlocking rod,
   wherein when the fastening screw is detached from the second housing, the unlocking bolt is rotated and pressed to make the unlocking rib of the unlocking bolt contact the one-way inner ratchet via the fastening element, and then the unlocking bolt is rotated in the unlocking rotation direction to make the unlocking rib rotate the one-way inner ratchet.

4. The electronic device as claimed in claim 3, wherein the unlocking bolt further comprises a buckle disposed on an upper portion of the unlocking rod, and the ejection element further comprises an elastic arm,
   wherein when the buckle is on the elastic arm, the elastic arm abuts the buckle.

5. The electronic device as claimed in claim 3, wherein the unlocking bolt further comprises an unlocking head connected to a top end of the unlocking rod, a width of the unlocking head is greater than a width of the unlocking rod, and the width of the unlocking head and the width of the unlocking rod is measured in a same direction.

6. The electronic device as claimed in claim 3, wherein the fastening element further comprises a buckle groove and an unlocking hole, the unlocking rib is selectively located within the buckle groove or within the unlocking hole.

7. The electronic device as claimed in claim 6, wherein the unlocking bolt further comprises a restriction rib connected to a central portion of the unlocking rod,
   when the unlocking rib contacts the one-way inner ratchet via the unlocking hole, the restriction rib is in the buckle groove.

8. The electronic device as claimed in claim 6, wherein when the fastening screw is fastened to the second housing, the unlocking rib is located in the buckle groove, thereby preventing the unlocking bolt from rotating relative to the fastening element.

9. The electronic device as claimed in claim 7, wherein the unlocking rod extends in an extension direction, and the unlocking rib is separated from the restriction rib in a projection plane perpendicular to the extension direction.

10. The electronic device as claimed in claim 1, wherein the ejection element further comprises:
   an ejection body, wherein the unlocking bolt is movably disposed in the ejection body; and
   a guide rib disposed on an outer surface of the ejection body,
   wherein the fastening element further comprises a guiding groove extending in an extension direction, and the guide rib is located within the guiding groove to guide the ejection element moving in the extension direction.

11. The electronic device as claimed in claim 1, wherein the first housing comprises an opening, the hollow base comprises a first holder and a second holder,
   the first holder is affixed to the first housing, and positioned correspondingly to the opening, and the second holder is affixed to the first holder.

12. The electronic device as claimed in claim 11, wherein the first holder and the second holder are hollow structures, the first holder is communicating with the opening and the second holder, the second holder comprises an aperture, the second housing comprises a locking base, and
   the fastening screw is configured to be fastened to the locking base of the second housing via the aperture, so as to affix the first housing to the second housing.

13. The electronic device as claimed in claim 12, wherein the fastening screw comprises a screw head and a screw rod connected to the screw head, the screw head comprises the one-way inner ratchet and the one-way outer ratchet, and the screw rod extends through the aperture,
   wherein a width of the screw head is greater than a width of the screw rod and a width of the aperture, and the width of the screw head, the width of the screw rod, and the width of the aperture are measured in a same direction.

14. The electronic device as claimed in claim 11, wherein the first housing further comprises a blocking structure disposed in the opening, configured to block the fastening element and the ejection element.

\* \* \* \* \*